ELECTRICAL CIRCUIT USING THERMAL ELEMENTS

Filed April 16, 1954

3 Sheets-Sheet 1

INVENTORS.
SIDNEY DAVIS
HENRY A. HAMMERSTEIN
PAUL H. SAVET
BY Raymond A. Paquin
ATTORNEY.

Oct. 22, 1957 S. DAVIS ET AL 2,810,885

ELECTRICAL CIRCUIT USING THERMAL ELEMENTS

Filed April 16, 1954 3 Sheets-Sheet 2

INVENTORS.
SIDNEY DAVIS
HENRY A. HAMMERSTEIN
PAUL H. SAVET
BY Raymond A. Paquin
ATTORNEY.

Oct. 22, 1957 S. DAVIS ET AL 2,810,885

ELECTRICAL CIRCUIT USING THERMAL ELEMENTS

Filed April 16, 1954 3 Sheets-Sheet 3

INVENTORS.
SIDNEY DAVIS
HENRY A. HAMMERSTEIN
PAUL H. SAVET

BY Raymond A. Paquin
ATTORNEY.

United States Patent Office 2,810,885

Patented Oct. 22, 1957

2,810,885

ELECTRICAL CIRCUIT USING THERMAL ELEMENTS

Sidney Davis, Westbury, Henry A. Hammerstein, Brooklyn, and Paul H. Savet, Oceanside, N. Y., assignors to American Bosch Arma Corporation, a corporation of New York Application April 16, 1954, Serial No. 423,788

8 Claims. (Cl. 332—4)

The present invention relates to electrical networks and has particular reference to devices using thermal elements.

Signal transfer devices using heat as the transfer medium have been used for introducing time delays. These prior units have employed separate heating and heated elements and their relatively long time constants have therefore made them unsuitable for computer applications. One method of reducing the time constant has been to use degenerative feedback in conjunction with a high gain amplifier in the input circuit such as described in a copending application 261,255, filed December 12, 1951, by J. Statsinger. The present invention, however, contemplates using single element as the input and output element to obtain an extremely short time constant, and uses rectifiers to accomplish the switching between the input and output circuits. This arrangement produces a less costly, smaller and more dependable device.

The device of this invention may be used in a number of circuits for computing devices, modulators or demodulators, quadrature and harmonic rejectors, or for many other purposes. This description, however, will emphasize the quadrature and harmonic rejection.

In a preferred embodiment of this invention a pair of series connected resistors having an appreciable temperature coefficient of resistance are connected across a transformer secondary winding through one pair of rectifying devices, one rectifier in each connection between the resistors and the transformer. The output device, which may be a transformer, is similarly connected across the resistors through a second pair of rectifiers.

One reference voltage is connected between the center tap of the input transformer and the junction of the resistors, and a second reference voltage is connected between the center tap of the output transformer and the junction of the resistors. The first reference voltage is used to raise the temperature of the resistors to a quiescent value and the signal voltage causes a proportional unbalance in the temperatures, making one resistor hotter and the other cooler. The second reference voltage senses the unbalance as a difference in the currents in the resistors to produce an output voltage whose magnitude is proportional to the magnitude of the reference voltage and to the unbalance of the resistors. Thus, multiplication can be performed by using one signal voltage as the second reference voltage, and the other signal as the input voltage.

The rectifiers are connected in one modification so that both resistors are heated on one half cycle of reference voltage and the output is taken during the opposite half cycle of reference voltage. In another modification, while one resistor is being heated, the output is being taken off the other resistor.

It will be seen that since the quadrature voltage produces equal heating in both resistors, there is no unbalance due to quadrature voltage and the output will not contain any quadrature component. Also, since the output is a function of the second reference voltage the output will not contain appreciable harmonics if the reference voltage is a true sine wave.

For a better understanding of the invention, reference may be had to the accompanying diagrams, in which.

Figure 1:
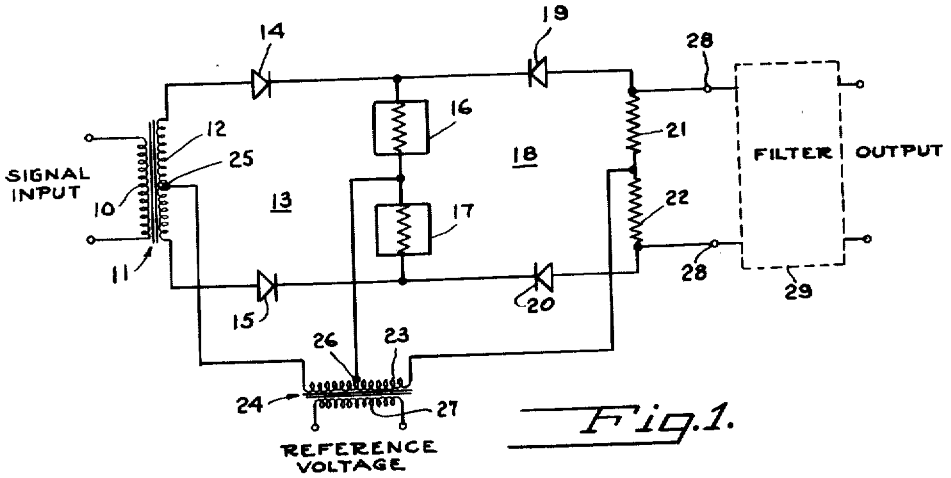
Figure 1 is a schematic diagram of one embodiment of the invention.

Referring now to Figure 1, the input signal, containing both quadrature and harmonic voltages, is applied across the primary winding 10 of transformer 11. The secondary winding 12 of transformer 11 is connected in a bridge circuit in which two of the branches each comprise one half of winding 12 and a rectifier 14 or 15, and the other two branches each contain one thermal unit 16 and 17. The rectifiers 14 and 15 are each connected similarly to permit current to flow only away from the transformer winding 12. The thermal units 16 and 17 are similar to each other and may be simply series resistance devices having either negative or positive temperature coefficients. For example, each unit 16 and 17 may be a small incandescent electric light having a tungsten filament.

A second bridge circuit 18 also uses the thermal units 16 and 17 as two branches while each of the other two branches contains one of rectifiers 19 and 20 connected in series with the similar resistors 21 and 22 respectively. The rectifiers 19 and 20 are connected to allow current to flow only from the resistors 21, 22 toward the thermal units 16, 17.

One end of secondary winding 23 of transformer 24 is connected to the center tap 25 of secondary winding 12 and the other end of winding 23 is connected to the junction of resistors 21, 22. An intermediate tap 26 on winding 23 is connected to the junction of thermal units 16 and 17. The primary winding 27 of transformer 24 is energized by a reference voltage, which is a constant amplitude alternating voltage having a frequency equal to the frequency of the signal supply at transformer 11.

During each positive half-cycle of the reference voltage, the voltage across the taps 25 and 26 is of such direction and magnitude that both the rectifiers 14 and 15 are made conductive. The total current through each of the thermal units 16 and 17 is the sum of the component currents due to the reference voltage and the signal voltage. The reference voltage produces a current which divides equally in the units 16, 17 and flows in opposite directions therethrough, while the signal voltage produces a current which flows in one direction through both of the units 16 and 17. Thus, the current in one unit 16 or 17, is greater than the current in the other unit 17, or 16 (depending on the phase of the signal voltage with respect to the reference voltage) and the unit carrying the greater amount of current is heated to a higher temperature than the other. Assume for the moment that conditions are such that unit 16 becomes hotter than unit 17. The unbalance in temperature is proportional to the magnitude of the signal voltage at transformer 11.

During each negative half-cycle of the reference voltage the rectifiers 19, 20 are made conductive while rectifiers 14, 15 are non-conductive. The currents through the parallel paths containing resistor 21 and thermal unit 16 and containing resistor 22 and thermal unit 17, produced by the reference voltage divide according to the conductance of the paths. Thus unit 16 being hotter than unit 17 is less conductive and a smaller current flows in resistor 21 than in resistor 22. The voltage output, at terminals 28, taken across the resistors 21 and 22 is the sum of the voltages across the resistors 21, 22. Since the currents flow in opposite directions through the resistors 21, 22, the total voltage is the difference between the voltage across resistor 21 and the voltage across resistor 22. The output voltage over a period of time resembles a half wave rectified voltage, and a filter 29 can be used to smooth the output if desired.

The quadrature voltage in the signal input will produce equal heating of the thermal units 16, 17 and no unbalance in temperature will be produced thereby. Thus, the output at terminals 28 is proportional in magnitude to the in-phase component of the signal voltage at transformer 11 only.

The magnitude of the output voltage, however, will reflect some of the harmonics present in the signal supply since the harmonics can contribute to the unbalancing of the thermal units, but the shape of the output signal is a pure sine wave if no harmonics are present in the reference voltage.

Figure 2:
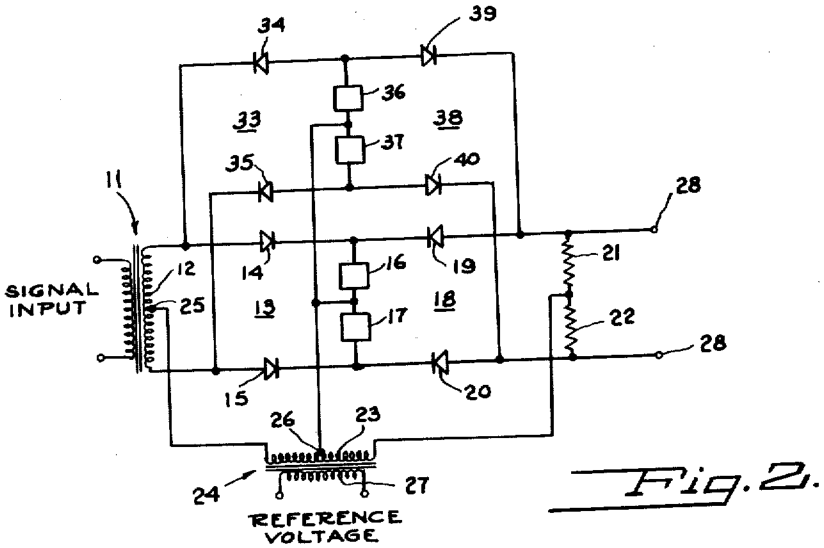
Figure 2 is an improved circuit of the device shown in Fig. 1.

The half wave output voltage at terminals 28 of Figure 1 may be undesirable in many instances, and for a full wave output the circuit of Figure 2 may be used.

Figure 2 shows two bridge circuits such as in Figure 1 connected in parallel between the input transformer 11 and the output resistors 21, 22. Thus, the bridge 33, comprising secondary winding 12, rectifiers 34, 35 and thermal units 36, 37, and bridge 38 comprising thermal units 36, 37 rectifiers 39, 40 and resistors 21, 22 are connected similarly to bridges 13, 18 except that the rectifiers 34, 35 and 39, 40 are connected oppositely to the respective pairs of rectifiers 14, 15 and 19, 20. That is, the rectifiers only pass current flowing away from the thermal units 36 and 37.

Now, during a positive half cycle of reference voltage while the thermal units 16 and 17 are being unbalanced as shown in Fig. 1, there is an output voltage at terminals 28 resulting from the current flowing through rectifiers 39 and 40 and the unbalanced thermal units 36, 37 in the bridge circuit 38.

Similarly, during the negative half cycle of reference voltage while the output at terminals 28 is determined by the unbalance in thermal units 16, 17 as described in connection with Figure 1, the thermal units 36, 37 in bridge 33 are being unbalanced.

Thus, the voltage at terminals 28 is a sine wave, without filtering and contains no quadrature component of the input signal since the quadrature current does not produce unbalance of bridges 13 or 33.

Figure 3:
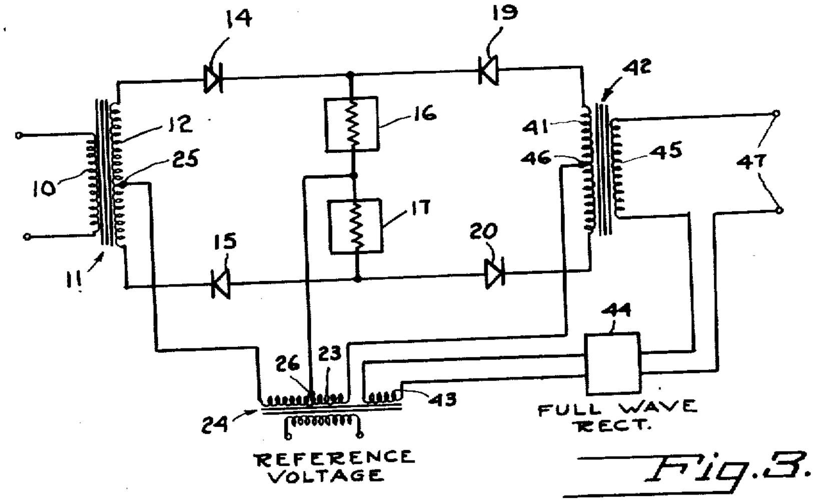
Figure 3 is another embodiment of the present invention.

Figure 3 shows a modification of Figure 1 which will produce the full wave output with fewer additional components than used in Fig. 2.

In this circuit, the rectifiers 15 and 20 are reversed and preferably the resistors 21 and 22 are replaced by the primary winding 41 of a transformer 42. The output of a second secondary winding 43 on transformer 24 is rectified in the full wave rectifier 44, and the output of the rectifier is subtracted from the output of secondary winding 45 of transformer 42. The operation of this circuit differs somewhat from the operation of Figures 1 and 2 and can be explained most easily with the aid of Figures 4, 5 and 6.

Let the voltage between the winding taps 25 and 26 be called reference voltage A and the voltage between winding tap 26 and the center tap 46 on winding 41 be called reference voltage B.

It will be seen that during one half cycle of reference voltage current will flow through rectifier 14 and resistor 16 due to reference A. and another current will flow through rectifier 20 and resistor 17 due to reference B. On the other half cycle of reference voltage, resistor 17 will be energized by reference A which resistor 16 will be in the output circuit containing reference B.

Assuming that the resistances 16 and 17 are matched, they will be raised to the same temperature by reference A, and will therefore present equal resistances to reference B when the signal voltage to transformer 11 is zero. Under these conditions it will be seen that the output of winding 45 resembles a full wave rectified signal of constant magnitude such as shown in Fig. 4.

When the signal voltage to transformer 11 is not zero the signal voltage will assist the reference A in heating one of the resistors 16 or 17 and will oppose the heating of the other resistor 17 or 16 depending on the relative phases of the signal voltage and the reference voltage. Thus the resistance of either resistances 16 or 17 will be greater than the resistance of the other and the currents in winding 41 of transformer 42 and produced by reference B will be smaller on one half cycle and greater on the opposite half cycle. The output of winding 45 therefore will be as shown by the solid line of Figure 5 when the signal voltage is not zero.

Figures 4, 5, 6:
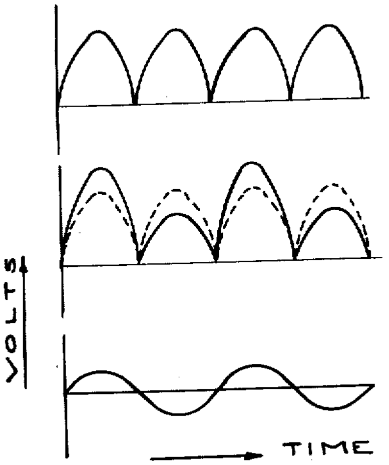
Figure 4 is a curve showing the quiescent voltage in one part of the circuit of Fig. 3 for zero input signal.
Figure 5 is a curve showing the same voltage as in Fig. 4 for a finite input signal.
Figure 6 is a curve showing the output of the device of Fig. 3.

The output of full wave rectifier 44 resembles the curve shown in Figure 4 and is shown in Figure 5 as the dotted curve. The maximum amplitude of the output of rectifier 44 is constant and is equal to the amplitude of the output of winding 45 when the signal voltage is zero. When the output of rectifier 44 is subtracted from the output of winding 45, a sine wave output signal as shown in Figure 6 is obtained at terminals 47.

Figure 7:
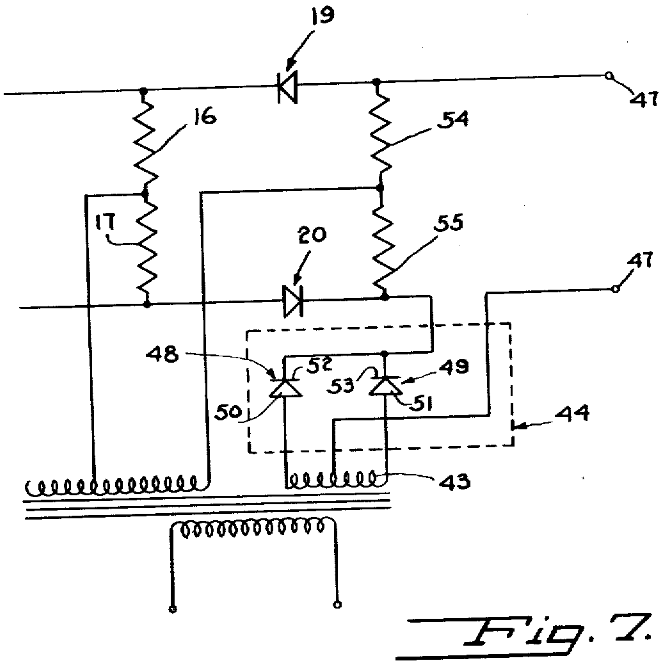
Figure 7 is a modification of Figure 3.

Figure 7 is a modification of a part of Figure 3 by means of which any direct current component introduced by the rectifier 44 will be eliminated from the output and is particularly useful with the simple type of rectifier shown in Figure 7. Rectifier 44 is a conventional full wave rectifier containing the diodes 48, 49, having cathodes 50 and 51 connected to the ends of the winding 43 and having the anodes 52 and 53 connected to each other. The resistors 54 and 55, such as those shown in Figures 1 and 2, replace the transformer 42 of Figure 3. The junction of the anodes 52 and 53 is connected to the junction of resistor 55 and rectifier 20. The center tap of transformer winding 43 is connected to one of the output terminals 47 while the junction of resistor 54 and rectifier 19 is connected to the other output terminal 47. The center tap of winding 43 may be connected to ground.

Although the circuits shown and described have been called quadrature and harmonic rejection circuits they may be used in many other applications such as in modulators and demodulators, frequency changers, lead networks, computers, etc. without departing from the scope of the claims.

We claim:

1. In a device of the character described, an input signal voltage, two reference voltages, said reference voltages, said reference voltages being 180° out of phase with each other, said signal voltage and said reference voltages all being of the same frequency and said signal voltage being in phase with one of said reference voltages, two thermally responsive members, means including rectifier means in series with each member for applying one of said reference voltages to each of said thermally responsive members to effect equal heating of said members, means for unbalancing the thermal conditions of said thermally responsive members according to said input signal, means including said rectifying means for applying the second of said reference voltages to each of said thermally responsive members, said rectifying means being connected to cause the first reference voltage to be applied to at least one member during one half cycle of the first reference voltage, and the second reference voltage to be applied to the same member during the other one half cycle of the first reference voltage.

2. In a device of the character described, a signal voltage, a first reference voltage in phase with said signal voltage, a second reference voltage 180° out of phase with said first reference voltage, a pair of thermally responsive members energized according to the sum or difference of said signal voltage and said first reference voltage according to the relative phase relationship between said voltages, a third voltage resulting from the second voltage influenced by the thermal conditions of said thermally responsive members and a full wave rectifier to rectify said second voltage, the output of said full wave rectifier being connected in series with said third voltage to produce an output voltage.

3. In a device of the character described, an input signal voltage, two reference voltages, said reference voltages being 180° out of phase with each other, said signal voltage and said reference voltages all being of the same frequency and said signal voltage being in phase with one of said reference voltages, two thermally responsive members, rectifier means interposed between the reference voltages and said thermally responsive members for applying one of said reference voltages to each of said thermally responsive members to effect equal heating of said members, means for unbalancing the thermal conditions of said thermally responsive members according to said input signal, means including second rectifying means for applying the second of said reference voltages to each of said thermally responsive members alternately, said reference voltages being simultaneously applied to a different one of said thermally responsive members, said second rectifying means interposed between said second reference voltage and said thermally responsive members and an output voltage taken across said thermally responsive members.

4. In a device of the character described, an input signal voltage, two reference voltages, said reference voltages being 180° out of phase with each other, said signal voltage and said reference voltages all being of the same frequency and said signal voltage being in phase with one of said reference voltages, two thermally responsive members, rectifier means interposed between the reference voltages and the thermally responsive members for applying one of said reference voltages to each of said thermally responsive members to effect equal heating of said members, means for unbalancing the thermal conditions of said thermally responsive members according to said input signal, means for applying the second of said reference voltages to each of said thermally responsive members alternately, said reference voltages being simultaneously applied to a different one of said thermally responsive members, output terminals connected to said members through said rectifying means, second rectifying means having an input connected to said second reference voltage and an output interposed in the connections between said thermally responsive members and said output terminals.

5. In a device of the character described, an input signal voltage, two reference voltages, said reference voltages being 180° out of phase with each other, said signal voltage and said reference voltages all being of the same frequency and said signal voltage being in phase with one of said reference voltages, two thermally responsive members, rectifier means interposed between the reference voltages and said thermally responsive members for applying one of said reference voltages to each of said thermally responsive members to effect equal heating of said members, means for unbalancing the thermal conditions of said thermally responsive members according to said input signal, means including second rectifying means for applying the second of said reference voltages to each of said thermally responsive members alternately, said reference voltages being simultaneously applied to a different one of said thermally responsive members, said second rectifying means interposed between said second reference voltage and said thermally responsive members and an output voltage taken across said thermally responsive members, said second rectifying means interposed between said output and said thermally responsive members and means for connecting said second reference voltage to the output through a full wave rectifier.

6. In a device of the character described, input means, a signal voltage applied to said input means, a pair of thermally responsive members, a first pair of rectifiers, a circuit including said input means, said members, said rectifiers and electrical connections, one of said rectifiers being interposed in each of said connections between said input means and said thermal members, a first reference voltage connected to said input means and to said members, an output element, a second pair of rectifiers, a second circuit including said output element, said second pair of rectifiers, said thermal elements and electrical connections, one of said second pair of rectifiers being interposed in each of said connections between said output elements and said thermal members, a second reference voltage connected to said output element and said thermal members, the rectifiers of said first pair being oppositely poled, the rectifiers of said second pair being oppositely poled and output terminals connected to said output element.

7. In a device of the character described, input means, a signal voltage applied to said input means, a pair of thermally responsive members, a first pair of rectifiers, a circuit including said input means, said members, said rectifiers and electrical connections, one of said rectifiers being interposed in each of said connections between said input means and said thermal members, a first reference voltage connected to said input means and to said members, an output element, a second pair of rectifiers, a second circuit including said output element, said second pair of rectifiers, said thermal elements and electrical connections, one of said second pair of rectifiers being interposed in each of said connections between said output elements and said thermal members, a second reference voltage connected to said output element and said thermal members, the rectifiers of said first pair being oppositely poled, the rectifiers of said second pair being oppositely poled and output terminals connected to said output element, a full wave rectifying means having an input and an output, said rectifying means output being interposed between said output element and said output terminals and said rectifying means input being connected to said second reference voltage.

8. In a device of the character described, input means, a signal voltage applied to said input means, a pair of thermally responsive members, a first pair of rectifiers, a circuit including said input means, said members, said rectifiers and electrical connections, one of said rectifiers being interposed in each of said connections between said input means and said thermal members, a first reference voltage connected to said input means and to said members, an output element, a second pair of rectifiers, a second circuit including said output element, said second pair of rectifiers, said thermal elements and electrical connections, one of said second pair of rectifiers being interposed in each of said connections between said output elements and said thermal members, a second reference voltage connected to said output element and said thermal members, the rectifiers of said first pair being similarly poled, the rectifiers of said second pair being similarly poled and output terminals connected to said output element.

References Cited in the file of this patent

UNITED STATES PATENTS

| | | |
|---|---|---|
| 2,020,409 | Green | Nov. 12, 1935 |
| 2,265,296 | Lee | Dec. 9, 1941 |
| 2,459,104 | Gilbert | Jan. 11, 1949 |
| 2,677,054 | Cohen | Apr. 27, 1954 |

UNITED STATES PATENT OFFICE

CERTIFICATE OF CORRECTION

Patent No. 2,810,885 October 22, 1957

Sidney Davis et al.

It is hereby certified that error appears in the printed specification of the above numbered patent requiring correction and that the said Letters Patent should read as corrected below.

Column 4, lines 56 and 57, strike out "said reference voltages,"; line 67, for "said rectifying" read -- second rectifying --.

Signed and sealed this 26th day of November 1957.

(SEAL)
Attest:

KARL H. AXLINE
Attesting Officer

ROBERT C. WATSON
Commissioner of Patents